United States Patent Office 3,427,404

Patented Feb. 11, 1969

3,427,404

SWITCHING ARRANGEMENT FOR A TELEPHONE INSTALLATION

Dieter Finkhäuser, Unterpfaffenhofen, and Erwin Huber, Munich, Germany, assignors to Siemens Aktiengesellschaft, Munich, Germany Filed Feb. 18, 1964, Ser. No. 345,804
Claims priority, application Germany, Feb. 20, 1963, S 83,817
U.S. Cl. 179—18 5 Claims
Int. Cl. H04m 3/00

ABSTRACT OF THE DISCLOSURE

Each subscriber station of a telephone installation includes an audio frequency digit signal transmitter. Each audio frequency signal transmitted at the selection of a digit is preceded by a preparatory signal. The preparatory signal prepares a central audio signal receiver for receiving the audio signals for each digit to establish a demanded call connection and, after a connection is made, initiates special switching operations.

CROSS REFERENCE TO RELATED APPLICATION

Figure 1A:
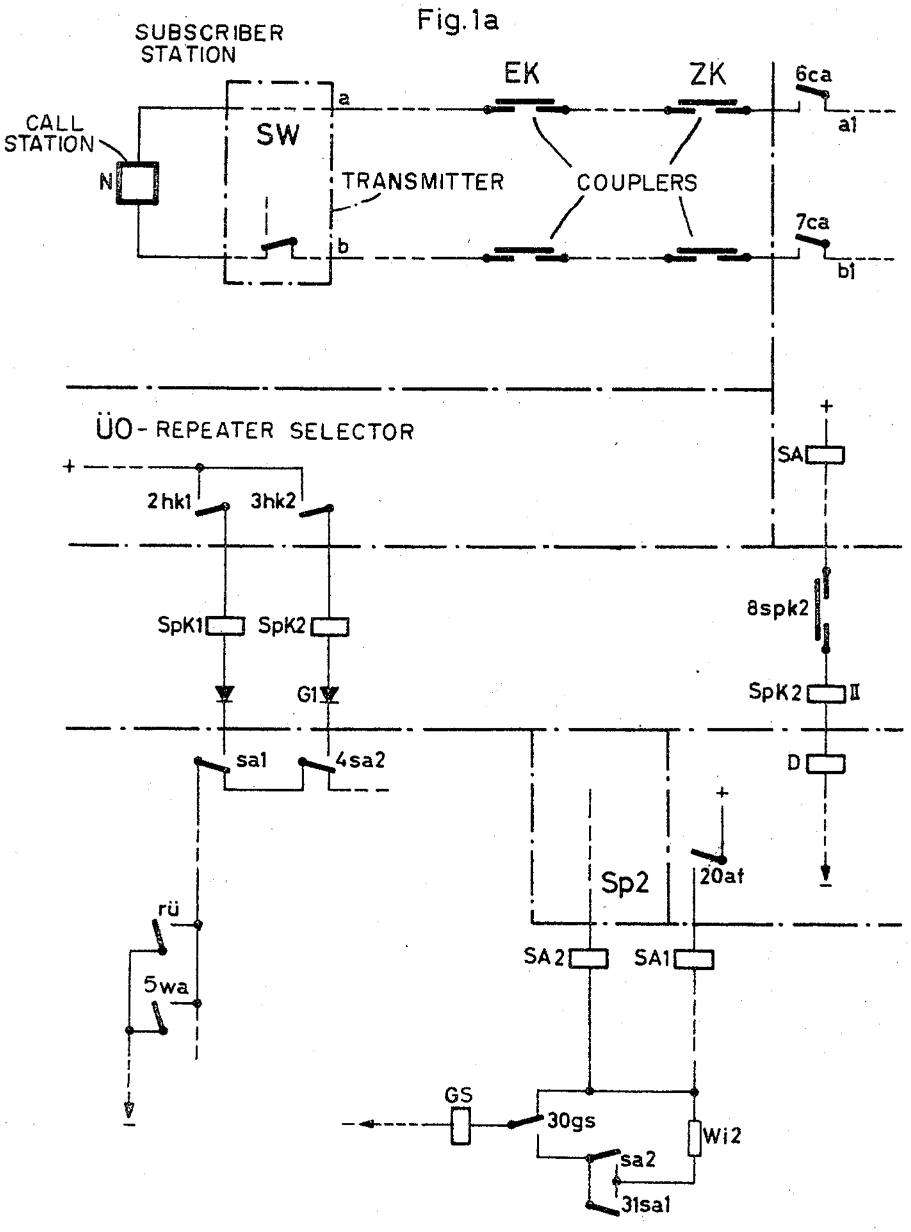
Figure 1B:
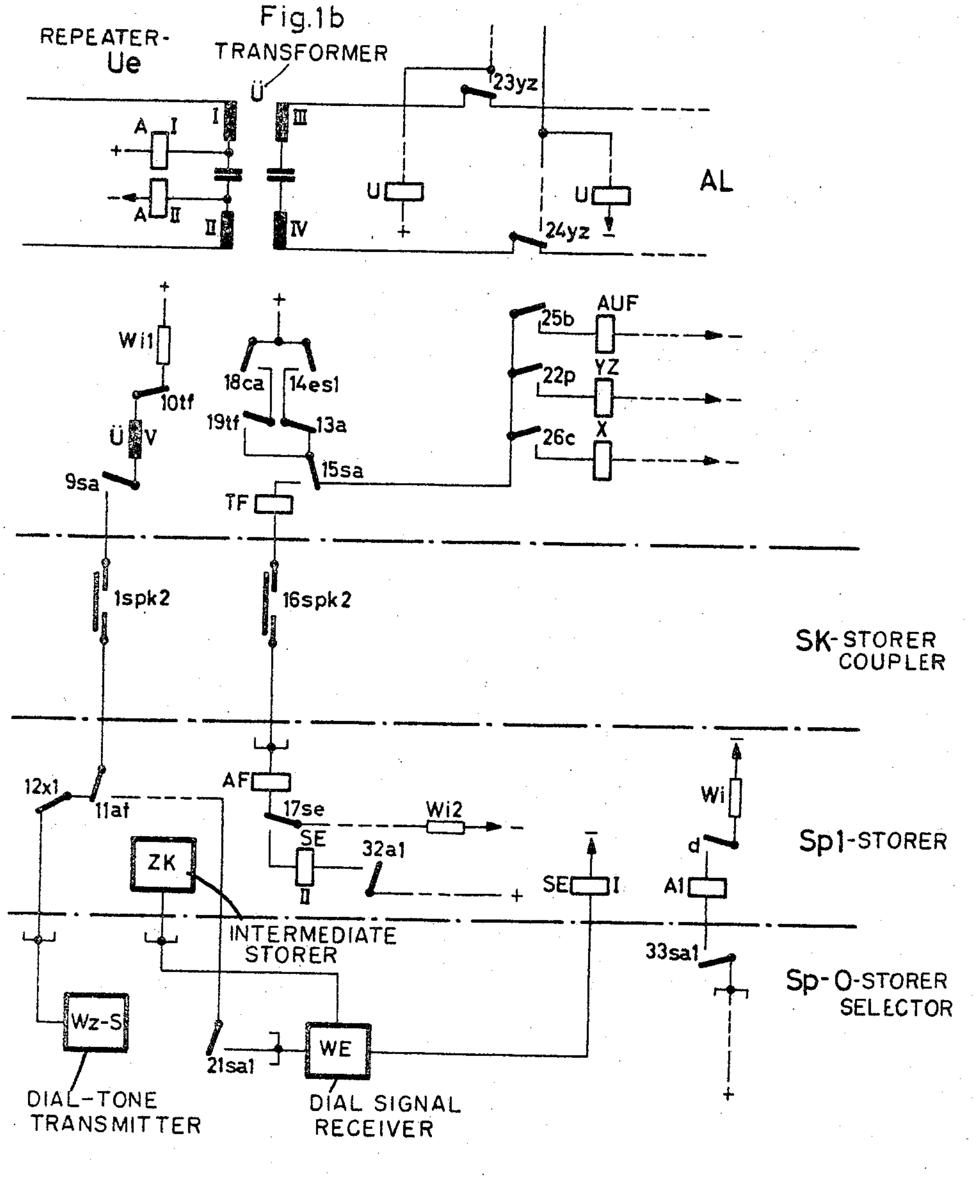

Applicants claim priority from corresponding German patent application Ser. No. S 83,817 filed Feb. 20, 1963.

BACKGROUND OF THE INVENTION

*Field of the invention*

This invention relates to a switching arrangement for a telephone installation and, more particularly, to an installation having audio frequency digit signal transmitters for each subscriber station wherein a preparatory signal preceding each audio digit signal initiates switching operations at the installation.

*State of the prior art*

An arrangement is known which, before the emission of an audio frequency dial signal representing a digit, automatically effects a temporary circuit interruption. For the utilization of the audio frequency dial signal there is constantly connected, at the completion of transmission of the audio frequnecy dial signals, an audio frequency dial signal receiver in the speech circuit. The circuit interruption effected in the selection of each digit serves the purpose initially of preparing switching means for establishing a call connection and, after the establishment of a call connection and upon the further subsequent selection of an arbitrary digit, of initiating with such preceding circuit interruption, or preparatory signal, a special function such as a reconfirmation call.

SUMMARY OF THE INVENTION

This invention comprises an automatic switching arrangement for a telephone installation in which each subscriber station, or call station, is equipped with an audio frequency digit signal transmitter, commonly called a push button transmitter. In the selection of digits with such a transmitter, the audio frequency signals representing each digit are preceded by a preparatory signal. The term dial signal will be understood to designate such audio frequency signals generated by, and corresponding to each digit selected at a push button transmitter, and the term preparatory signal will be understood to comprise the circuit interruption or signal, typically a ground potential pulse, preceding each such dial signal. The preparatory signal is employed to prepare an audio frequency signal receiver in the installation to receive the associated audio frequency signals. When a call connection for the calling subscriber station is established, the audlo frequency signal receiver is released. A preparatory signal transmitted due to the selection of a further digit and the resultant transmission of associated audio frequency signals, initiates switching operations for making special facilities available to the subscriber, such as call back, or reconfirmation call, connections and transfer connections. This is achieved according to the invention by a system where, in the selection of each digit for the making of a connection, a preparatory signal is transmitted over the existing connection between the seized repeater and a storer. This preparatory signal forms a control for the connection-making switching means of the storer, and actuates a central dial signal receiver in the speech circuit. After connection is made, dependent on the existing switching conditions, the switching means for the repeater are controlled by the preparatory signal, and a transfer, or switchover during the connection in question may be initiated.

Through the arrangement according to the invention, therefore, in the transmission of each digit signal, a preparatory signal for the seized repeater is sent, and in the one operating condition a temporary actuation of the dial signal receiver is effected, and in the other operating condition after connection is made, a special switch-over is effected. There is controlled, therefore, in a simple manner, by the preparatory signal, in contrast to the known systems, both the switching in of the central dial signal receiver in the speech circuit, and also, after connection is made, the special switch-over of the repeater.

In accordance with a further feature of the invention, an audio frequency dial signal receiver is connected to the speaking path in response to the preparatory signal preceding the audio frequency signals corresponding to each digit for the establishment of a call connection. The dial signal receiver is connected over the existing connection between the seized repeater and the storer for controlling the establishment of the call connection through the switching means of the storage means and is connected over the same coupling point in the storer as the dial tone transmitter was previously connected, and in place thereof.

DETAILED DESCRIPTION OF THE INVENTION

The drawing illustrates an example of the invention with such details as are desirable for an understanding thereof. There is represented a call or subscriber station N and a corresponding transmitting device SW allocated to such call station. The transmitting device SW is, for example, atransmitting device to which there is allocated a time switch employing a control transistor. When a push button is depressed for dialing of the first digit there is effected by the time switch a brief circuit interruption prior to the transmission, of, for example, an audio frequency coded dial signal. The audio frequency dial signals may be sent, in known manner, from an oscillator allocated to the call station. The connection of a free repeater U*e* to a calling station is accomplished, for example, over several coupling stages EK and ZK. This connection of a call station to a repeater takes place only after it is determined that a fre estorer S*p*, e.g. S*p*1 is available. This determination is made dependent upon a circuit running from the transmission selector ÜO and storer coupler SK to the storer selector S*p*–O.

On the lifting of the receiver by the subscriber of call station N, an impulse is produced for identification device, such as described in U.S. Patent No. 3,242,266. From the identification device, after determination of the identification of the calling station N, an impulse is transmitted to the repeater selector ÜO and to the storer selector S*p*–O. The repeater selector ÜO includes means for indicating the engaged or available conditions of each of the plurality of repeaters associated with the installation. If, for example, the first repeater is engaged or occupied, the contact 2*hk*1 is not closed. If it is assumed that the second repeater is available, the contact 3*hk*2 is actuated by a pulse transmitted by the identification device to the repeater selector ÜO in a manner not illustrated. The actuation of contact 3*hk*2 takes place in response to the operation of a seizure chain, such as a selection circuit comprising a bank of seizing elements, which identifies the state of seizure of the repeaters in order to identify and select a free repeater, such as in the manner described in U.S. Patent No. 3,242,266. In this example, the first free repeater of the installation is assumed to be the repeater U*e* illustrated in the drawings.

If the first storer S*p*1 is indicated to be free, the impulse from the identification unit actuates contact 5*wa* in the storer selector S*p*–O, in a manner not shown, and the following circuit is produced for the switching in of the coupling relay S*p*K2 over the contact 3*hk*2 which indicates the repeater U*e* to be free:

(1) +, . . . , 3*hk*2, S*p*K2 (I), G1, 4*sa*2, . . . , 5*wa*, . . . , —

Simultaneously with this energization of the coupling relay S*p*K2, there are also operated the coupling contacts of the couplers EK and ZK for the connection of the call station N with the repeater U*e*. In the repeater U*e*, through the connection of the subscriber circuit of call station N with the repeater U*e*, the connecting or seizing contacts 6*ca* and 7*ca* are closed. Operation of the couplers EK and ZK may be in accordance with the description of such an operation in U.S. Patent No. 3,242,266, and actuation of the contacts 6*ca* and 7*ca* may be in accordance with the description of such contact actuation in U.S. patent application Ser. No. 366,275, filed June 7, 1964 and claiming a German priority date of June 7, 1963, now U.S. Patent No. 3,376,391 issued Apr. 21, 1968.

Coupling relay S*p*K2, when energized, closes its coupling contact 8*spk*2 whereby a holding circuit for the coupling relay S*p*K2 is established, as a result of which relay SA of the repeater U*e*, and the relay D of the storer S*p*1 are energized in the following circuit:

(2) +, SA, . . . , 8*spk*2, S*p*K2 (II), D, . . . , —

Relay SA of repeater U*e*, when thus energized, closes its contact 9*sa*; since coupling relay S*p*K2 is already energized and therefore its contact 1*spk*2 is closed, the winding V of the transformer Ü is connected over the coupling contact 1*spk*2 with the dial-tone transmitter W*z*–S, in the following circuit:

(3) +, W*i*1, 10*tf*, Ü(V), 9*sa*, 1*spk*2, 11*af*, 12*xl*, W*z*–S

The dial tone appearing at the transmitter winding V of the transformer Ü is inductively transmitted over windings I and II to the call station N.

If the subscriber of call station N now selects the first digit by depressing one of the push-buttons with which the transmitting device SW is equipped, then before the appropriate signal corresponding to the digit is transmitted by the transmitting device SW over the repeater U*e* to the storer S*p*1, a preparatory signal is applied to the relay A of the repeater U*e*. This preparatory signal is in effect a command to the exchange to prepare a dial signal receiving system or receiver for receiving a dial signal. The relay A is briefly disconnected by this preparatory signal for a time determined by the time switch associated with the transmitting device SW. Upon seizure of the repeater U*e*, its contact 14*es*1 is closed in a conventional manner; the energized relay SA closes its contact 15*sa* whereby, over the contact 13*a* in its normal position, the relay TF of the transmitter U*e* and the relay AF of the storer S*p*1 are energized in the following circuit:

(4) +, 14*es*1, 13*a*, 15*sa*, TF, 16*spk*2, AF, 17*se*, . . . , W*i*2, —

The response time of the relay TF determines the necessary energization duration of the relay A. After relay A is again actuated, the relays TF and AF are placed in the following holding circuit:

(5) +, 18*ca*, 19*tf*, 15*sa*, TF, 16*spk*2, AF, 17*se*, . . . , W*i*2, —

The contact 11*af* in the storer S*p*1 switches over from the dial-tone transmitter to the dial signal receiving WE. The contact 20*af* again switches in the relay SA1 of the storer selector, provided that it has not previously been engaged by another repeater, and that the actuated contact 30*gs*, over the high-ohmic resistance W*i*2, prevents the engagement of relay SA1. The relay SA1 is actuated in the following circuit, in which the relay GS also is active:

(6) +, 20*af*, SA1, . . . , 30*gs*, GS, . . . , —

The relays SA1 and GS are held over the operated contacts 30*gs* and 31*sa*1. Thereby, over the contact 21*sa*1 of relay SA1 of storer selector S*p*–O, there is established the following circuit for the inductive transmission of the dial signals, dialed by the subscriber, over windings I, II and V of the transformer Ü:

(7) +, W*i*1, 10*tf*, Ü(V), 9*sa*, 1*spk*2, 11*af*, . . . , 21*sa*1, WE

After the reception of the first code digit in the dial signal receiver WE, a contact 12*x*1 is actuated in the storer S*p*1 which permits renewed connections of the dial-tone transmitter W*z*–S to the transformer winding Ü(V) when the contact 11*af* returns to its normal, or rest, position. When the dial signal receiver WE has ascertained that a complete number has been received and simultaneously forwarded to the intermediate storer ZK of the storer S*p*1, for example in the direct current code, the relay SE of the appropriated storer S*p*1 is actuated. The energized relay SE actuates its contact 17*se*, and thereby opens the circuit to the relays TF and AF (circuit 4), so that by opening contact 20*af* the dial signal receiver is again freed as a result of the opening of the contact 11*af*; at the same time contact 20*af* opens, resulting in deenergization of relays SA1 and GS which in turn leads to opening of contact 21*sa*1 to maintain the dial signal receiver WE in the released state independently of contact 11*af*. To insure a correct release, the relay SE is held over its winding SE II and over the contact 32*a*1 until the relay A1 of the storer S*p*1 is deenergized, after freeing of the marker by the opening of contacts 33*sa*1. Thereby the dial signal receiver WE is freed for the time elapsing between the selection of separate, successive digits.

Only when a push button is depressed for a second, successive digit is another preparatory signal transmitted to the relay A of the repeater U*e*. The contact 13*a* again establishes the circuit 4 for the relays TF and 2F. As is described above, the dial signal receiver WE is again connected to the transformer winding V. This energization of the dial signal receiver WE takes place, as in described above, in response to energization of relay SA1, and the energization of relay SA1 takes place in dependence upon the demands being made on the dial signal receiver WE. The sequence of the connection of the dial signal receiver WE of the storer circuit Sp–O to a selected repeater is controlled by (*sa*)-contacts, the latter in a known manner (not illustrated) determining the sequence of connections. These contacts can also determine the sequence of connections if they are arranged in a network equipped with sequencing changeover contacts, in a known manner. Simultaneous engagement of several repeaters to the dial signal receiver WE is thus prevented.

When it is established that the digit selection has been completed and a switching to the desired call station or to the desired connecting line is possible, the actuation of the corresponding coupling contacts to establish a through-connection is initiated over the storer SP1 and thereupon the storer Sp1 is freed. The actuation of the couplers for establishing such connections and the freeing of the storer may be in accordance with the description of such operations set forth in U.S. Patent No. 3,242,266. This release takes place independently of the duration of the actuation of the dial by the initiating call station. If now, as described above, a connection of the call station N over the couplers EK and ZK has been established, for example, a connection with an exchange repeater, and over this exchange repeater the decade pulses converted by the dial signal receiver are fed over the exchange line to the selector of the public exchange, and if an exchange connection is made to a subscriber of the public exchange, then there may occur in the exchange repeater various switching conditions. These various switching conditions relate to special facilities which are available to the subscribers. One of these switching conditions is, for example, the speech condition, in which in the exchange repeater the priorities of the calling station are given, as, for example, a break-in priority right. Further switching conditions are, for example, the reconfirmation call or call-back, condition. This condition ordinarily, and in known prior art systems, results from actuation of a ground push button at the subscriber station participating in an existing exchange connection. In known arrangements, transfer of calls is initiated when the calling or called speaking station actuates the ground push button during an existing reconfirmation call or call-back connection. Different switching conditions can also arise in other line repeaters, for example, during an existing connection. Reconfirmation call and transfer connections, of course, are well known in the art and a more detailed explanation thereof is provided in U.S. Patent No. 3,242,266.

Since there is allocated to the call station N the transmitting device SW, by means of which coded, especially audio-frequency signals, are applied to the connecting line, ground key actuation at the call station N will not bring about over the speech circuit any switching conditions in the repeater. Thus, for the initiation of special switching conditions in any given repeater, such as repeater U*e*, there is used the preparatory signal produced prior to each audio frequency signal; this preparatory signal is independent of the particular digit selected. This preparatory signal can, in itself, be given in any desired manner as a direct-current or alternating current signal, providing that no audible interference appears on the connecting line and it is possible to evaluate it in the repeater circuit.

If, for example, the subscriber of call station N actuates any of the push buttons 1 to 0, then for example in the case of an existing exchange connection, the preparatory signal is delivered to the relay A of repeater U*e*, in the example under consideration, as an indication of a circuit interruption. During the existing exchange connection, the exchange repeater U*e* is not connected with the storer S*p*1. The relays SA, S*p*K2 and D, therefore, are not energized. Likewise, the relays TF and AF are not energized, since the circuit 4 is not completed. Through the preparatory signal, the relay A of repeater U*e* is briefly disconnected so that, assuming that the switching condition in the case of existing exchange connection is characterized by the closed contact 22*p*, the known combination of relays Y and Z, represented symbolically by the relay YZ, becomes energized. Through the contacts 23*yz* and 24*yz* the establishment of the reconfirmation path is initiated to the calling back speaking station. The control of the establishment of the reconfirmation connection is accomplished in a known manner.

Another special condition may be that of a break-in priority. If an existing connection over the repeater U*e* cannot be completed to the desired subscriber since the latter is already engaged in a call connection, then, for example, the contact 25*b* of a priority identifying relay B is closed. By operating any push button (1 to 0) of the transmitting device SW, the relay AUF is energized by causing the contact 13*a* to be in the rest or normal position for a short time. Through this relay it is possible in a known manner to execute the particular switching.

For any given switching condition, which, for example, may be identified by the closure of contact 26*c* of relay X, there may be initiated in repeater U*e*, responsive to the receipt of a preparatory signal as a result of actuation of any of the push buttons of the transmitting device SW when the storage means is not connected thereto, a switching operation which will correspond to the current switching condition and to the depression of a push button. The switching operation may comprise a call transfer, corresponding to the switching condition wherein the subscriber is currently connected in a reconfimation or call-back connection. To effect a transfer of an exchange office connection, for example, there will be provided, instead of contact 13*a*, a contact of relay U. Relay U then similarly to relay A, and in a manner not illustrated, controls a further relay which accomplishes a transfer.

Changes may be made in the foregoing embodiments of the invention without departing from within the scope and spirit of the invention as set forth in the appended claims which define what is believed to be new and desired to have protected by Letters Patent.

We claim:

1. An automatic telephone installation to establish call connections and provide special facilities for subscriber stations of the installation, wherein each subscriber station is provided with a transmitter operable to produce audio frequency signals representative of digits and wherein each audio frequency digit signal is preceded by a preparatory signal, comprising:

a central receiver for receiving audio frequency digit signals from a calling subscriber station for demanding a call connection, means for rendering said receiver unavailable to a calling subscriber station engaged in an established call connection, and means responsive to receipt of a preparatory signal from a subscriber station of the installation engaged in an established connection to render a special facility available to the said engaged subscriber station.

2. An automatic telephone installation as recited in claim 1 wherein:

said response means comprises a repeater of the installation assigned to the calling subscriber, and said repeater includes a relay responsive to the preparatory signals.

3. An automatic telephone installation as recited in claim 2 wherein said repeater includes:

a plurality of switch means actuated in accordance with the switching condition of the call connection in which said calling subscriber is engaged, and a plurality of selective response means connected in circuit with corresponding switching means and operable when the corresponding switch means is actuated and in response to a preparatory signal from the calling subscriber station to which said repeater is assigned, to perform a switching operation providing a related special facility to the said calling subscriber.

4. An automatic telephone installation as recited in claim 1 wherein there is further provided means for requesting connection of said central receiver in response to each preparatory signal to receive the corresponding digit signal and for releasing said central receiver following receipt of the corresponding digit signal, as transmitted by a calling subscriber station of the installation not engaged in a call connection.

5. An automatic telephone installation as recited in claim 1 wherein there is further provided:

a central tone transmitter for transmitting an audio frequency selector tone signal to a calling subscriber station to request initiation of transmission of audio frequency digit signals demanding a call connection, a coupling circuit for connecting said tone transmitter with a calling subscriber station in response to initiation of a call demand at said station, and means responsive to receipt of a preparatory signal from said calling subscriber station for switching said coupling circuit to disconnect said tone transmitter and to connect said central receiver to said calling subscriber station to receive the corresponding audio frequency digit signal.

References Cited

UNITED STATES PATENTS 3,133,155 5/1964 Kuchas ---------- 179—16.45

WILLIAM C. COOPER, *Primary Examiner.*